June 10, 1947.   R. J. STODDARD   2,421,913
ERECTING APPARATUS
Filed April 14, 1945          5 Sheets-Sheet 1

*INVENTOR.*
ROBERT J. STODDARD
BY
*G. H. Braddock*
ATTORNEY

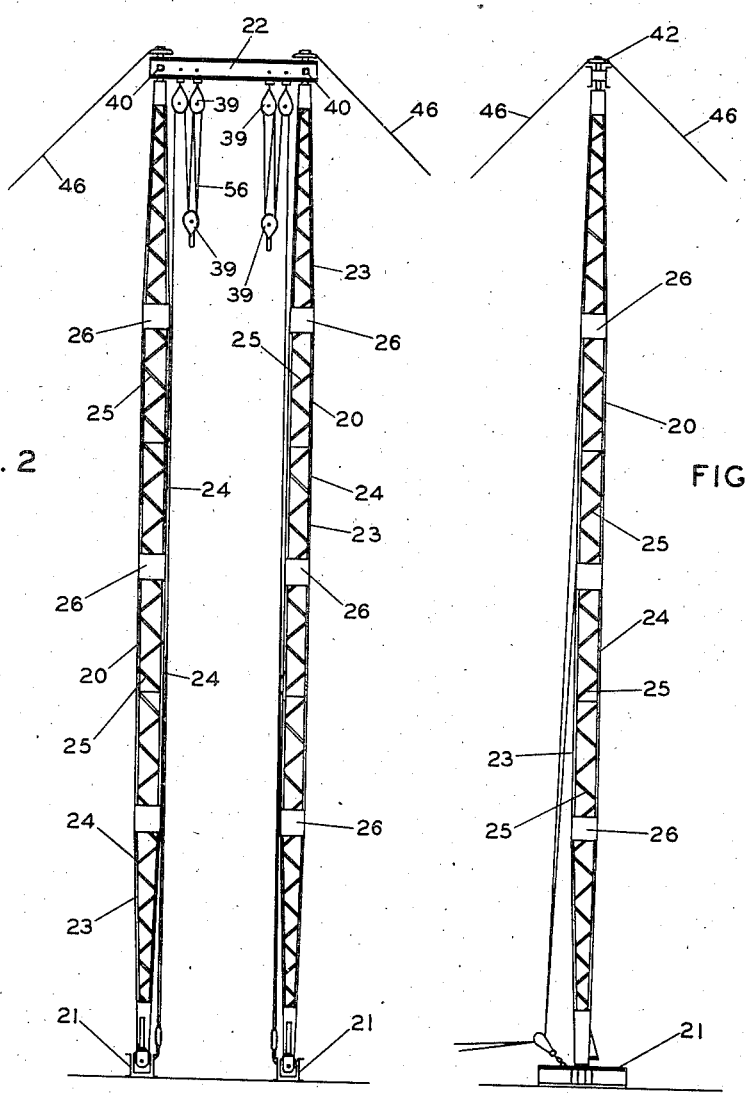

INVENTOR.
ROBERT J. STODDARD
BY
*G. H. Braddock*
ATTORNEY

Patented June 10, 1947

2,421,913

UNITED STATES PATENT OFFICE 2,421,913

ERECTING APPARATUS

Robert J. Stoddard, St. Paul, Minn., assignor to American Hoist & Derrick Co., St. Paul, Minn., a corporation of Delaware Application April 14, 1945, Serial No. 588,279

10 Claims. (Cl. 189—16)

This invention relates to an erecting apparatus and method, and has reference more particularly to an apparatus for and a method of accomplishing the erection and placement of massive or extremely heavy structures, bodies or entities, such, for example, as stills or pressure vessels, stacks, towers, etc.

In the petroleum refining industry, for an example, it is common practice to construct usually massive, extremely heavy stills or pressure vessels in factories, to transport the stills or pressure vessels to their intended locations or fields of use, and to there end-up and place each still or pressure vessel bodily upon or at a spot or definite situation selected for erection of the still or pressure vessel. An apparatus for erecting heavy structures, bodies or entities should of course be so constructed that liability of eccentric loading would be eliminated, thus to preclude the possibility of bending of weight supporting elements of the apparatus under load. Obviously, an apparatus for erecting structures, bodies or entities as heavy as stills or pressure vessels employed in the petroleum refining industry must itself of necessity be massive and heavy, and the manipulation to and the placement of an erecting apparatus sufficiently massive and heavy to the accomplishment of the up ending and placing of a really heavy load at the right position of the apparatus for the accomplishment of the erecting operation is, because of the weight of said apparatus, fraught with more or less difficulty. Stills or pressure vessels used in the petroleum industry are sometimes for convenience erected at their locations for use in alined and/or more or less closely adjacent relation to each other, thus evidently to cause additional difficulty in the erection of the stills or pressure vessels. That is, erected stills or pressure vessels sometimes become obstacles to the erection of other stills or pressure vessels. The erecting apparatus may be required to be moved about or around erected stills or pressure vessels, in more than a single direction, while being moved to correct position for accomplishing up ending and placing of a still or pressure vessel to be erected, and a nearby still or pressure vessel, or nearby stills or pressure vessels, may constrict or restrict the area about the spot or situation which is to receive a still or pressure vessel and the apparatus for erecting or setting it up. And, too, the terrain to receive stills or pressure vessels may include obstructions such as foundations or other structures which on occasion will offer difficulty to the accomplishment of erection.

The purpose of the present invention is to provide an apparatus for and a method of accomplishing the erection and placement of heavy structures, bodies or entities, such as stacks, towers and the like, and particularly stills or pressure vessels, which will be an improvement generally over apparatuses and methods for the same purpose heretofore known.

An object of the invention is to provide an apparatus for erecting heavy structures, bodies or entities which will be of novel and improved construction adapted to preclude the possibility of eccentric loading tending to cause disfigurement or bending of weight supporting elements of the apparatus due to uneven bearing upon foundations of said apparatus for said weight supporting elements.

A further object is to provide an apparatus for accomplishing the erection and placement of heavy structures, bodies or entities which will be of novel and improved construction to be movable to and away from its intended working position more easily and readily and by expenditure of less effort than are apparatuses of the prior art for the same purpose.

A further object is to provide an erecting apparatus which will be of novel and improved construction to be movable from place to place, as from one erecting position to another, in novel and improved and easy manner.

A further object is to provide an apparatus of the present character which will be of novel and improved construction to be capable of operation clear of obstructions which would interfere with or preclude operation of erecting apparatuses of type now of commerce.

A further object is to provide an erecting apparatus wherein will be incorporated various improved features and characteristics of construction which will be novel both as individual entities of the apparatus and in combination with each other.

A further object is to provide a novel and improved method of accomplishing the erection and placement of heavy structures, bodies or entities.

And a further object is to provide a novel and improved method of accomplishing movement of a heavy erecting apparatus from place to place, as from one erecting position of said apparatus to another erecting position for the apparatus.

With the above objects in view, as well as others which will appear as the specification proceeds, the invention comprises the construction, arrangement and combination of parts of the apparatus and the steps of the method as now to be fully described and as hereinafter to be specifically claimed, it being understood that the disclosure herein is merely illustrative and intended in no way in a limiting sense, changes in details of construction and arrangement of parts of the apparatus and in the sequence of the steps of the method being permissible so long as within the spirit of the invention and the scope of the claims which follow.

In the accompanying drawings forming a part of this specification,

Fig. 2 is an enlarged front elevational view of the apparatus of Fig. 1, parts being omitted;

Fig. 3 is an enlarged side elevational view of the apparatus of Fig. 1, parts being omitted;

Fig. 4 is a top plan view of the disclosure of Fig. 2;

Figure 1:
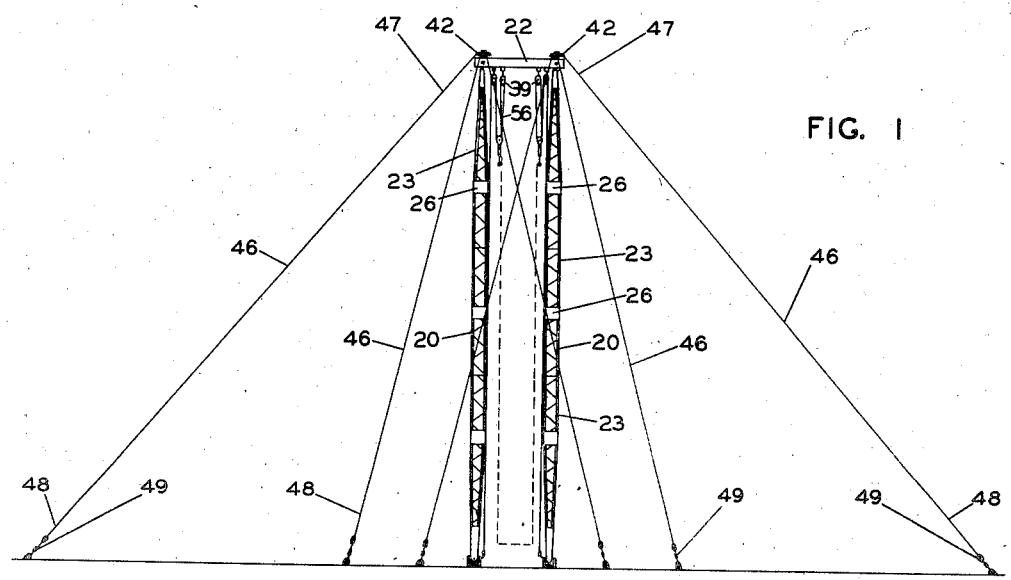
Fig. 1 is a front elevational view of an apparatus made according to the invention.
Figures 5, 6:
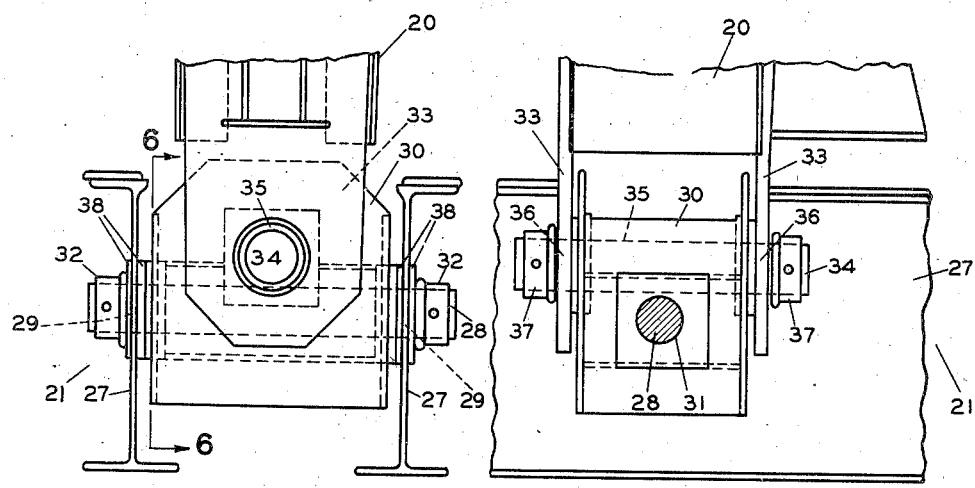
Fig. 5 is a further enlarged fragmentary front elevational view disclosing a foundation or skid and a portion of a weight supporting element of the apparatus and a universal connection between said foundation or skid and said weight supporting element.
Fig. 6 is a sectional view taken on line 6—6 in Fig. 5.
Figure 7:
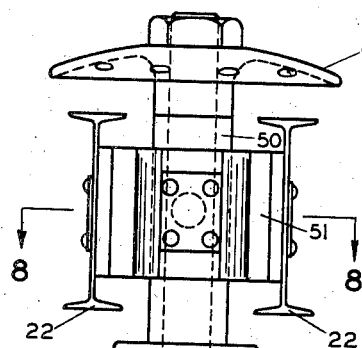
Fig. 7 is an enlarged fragmentary side elevational view disclosing a guy cap, a head frame or cross-beam and a portion of a weight supporting element of the apparatus and a universal connection between said head frame or cross beam and said weight supporting element.
Figure 8:
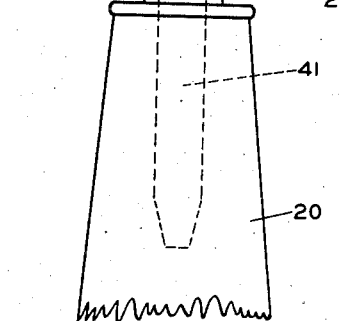
Fig. 8 is a detail sectional view taken on line 8—8 in Fig. 7.
Figure 9:
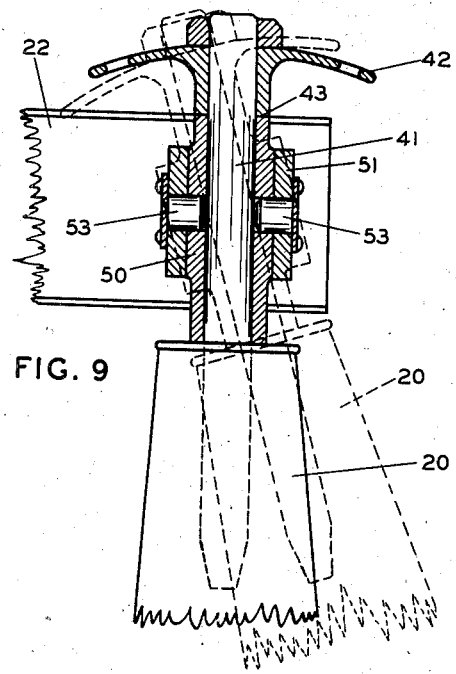
Fig. 9 is a detail sectional view taken as on line 9—9 in Fig. 8.
Figure 10:
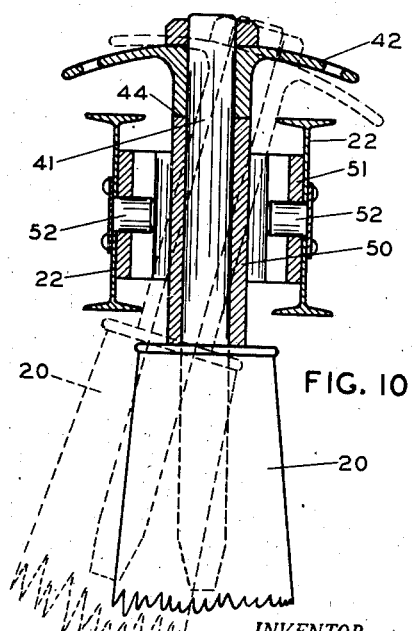
Fig. 10 is a detail sectional view taken as on line 10—10 in Fig. 8.

With respect to the drawings and the numerals of reference thereon, the erecting apparatus may include a pair of spaced apart, elongated weight supporting elements, columns, masts or shear legs 20, 20 each supported at its bottom upon a foundation or skid, denoted 21, 21, and each connected at its top to a head frame or cross-beam 22. Ordinarily, a unitary structure consisting of elements such as 20, 20, 21, 21 and 22 is known as a gallows frame.

Each of the elongated weight supporting elements 20 may be built up of separate sections 23. Sections such as 23 may be added when it is desired to increase the height and removed when it is desired to decrease the height of the erecting apparatus. As disclosed, each of the separate sections 23 is constituted as spaced longitudinally extending rigid metal members 24 and spaced obliquely extending rigid metal members 25 all welded into an integral structure, and rigid metal members or plates 26 are employed to connect said separate sections 23 to each other in any suitable and convenient manner.

Each of the foundations or skids 21 consists as disclosed of spaced apart, rigid I-beams 27, 27 adapted to rest firmly upon the ground, or other surface, and each foundation or skid, or the spaced apart I-beams 27, 27 thereof, universally carries its corresponding weight supporting element 20. More explicitly, as shown a lower cross member or cross shaft 28 of each foundation or skid 21 is mounted as at 29, 29 in the midlength and midwidth of the body of each of the spaced apart I-beams of the foundation or skid. A spacing and supporting frame 30 of each foundation or skid, disposed between the I-beams to insure their spaced relation, is oscillatably mounted at 31 upon the lower cross member or cross shaft 28, and collars 32, 32 upon the opposite end portions of said lower cross member or cross shaft 28, contiguous with or adjacent to the outer surfaces of the bodies of the I-beams 27, 27, preclude movement of said I-beams in direction away from each other. That is, the spacing and supporting frame 30 is oscillatably supported by the I-beams and precludes their movement toward each other, and the collars 32, 32 preclude movement of said I-beams away from each other, in the instance of each of the foundations or skids 21. Each spacing and supporting frame 30 oscillatably supports a corresponding elongated weight supporting element 20. To this purpose, the inner or lower end of each elongated weight supporting elements 20 includes spaced apart, inwardly or downwardly extending projections or ears 33, 33. An upper cross member or cross shaft 34 of each fondation or skid 21 is mounted as at 35 in the spacing and supporting frame 30 and as at 36, 36 in the projections or ears 33, 33. Said projections or ears 33, 33 are situated at the opposite sides of said spacing and supporting frame in contiguous relation or adjacent relation thereto in such manner as to preclude relative lateral movement between the projections or ears and the spacing and supporting frame, and collars 37, 37 upon the opposite end portions of the upper cross member or cross shaft 34 and contiguous with or adjacent to the outer surfaces of the projections or ears 33, 33 insure the position of said cross member or cross shaft 34 in said projections or ears and said spacing and supporting frame. The construction and arrangement are such that each spacing and supporting frame 30 is capable of having movement of oscillation only relative to the I-beams 27, 27 of its corresponding foundation or skid 21, and each elongated weight supporting element 20 is capable of having movement of oscillation only relative to its corresponding spacing and supporting frame 30. As disclosed, each lower cross member or cross shaft 28 is disposed perpendicularly of its corresponding I-beams 27, 27, and each upper cross member or cross shaft 34 is disposed parallelly of its corresponding I-beams in perpendicular relation to the lower member or cross shaft 28 which said I-beams support. Each cross member or cross shaft 34 desirably may be disposed at elevation above the cross member or cross shaft 28 of the corresponding foundation or skid 21 in the manner about as disclosed in the drawings. Preferably, each cross member or cross shaft 34 may be situated equidistantly from the spaced apart I-beams of the corresponding foundation or skid 21.

The spaced apart I-beams 27, 27 of each foundation or skid 21 may be retained in parallel relation through the instrumentality of thrust members 38 upon the lower cross member or cross shaft 28 and between the frame 30 and the collars 32, 32, or in any other suitable and convenient manner, and said I-beams will be spaced at sufficient distance apart to permit the corresponding weight supporting elements 20, or the projections or ears 33, 33 thereof, to be swung or moved to position parallel with said I-beams, when it may be desirable to cause said weight supporting element to be rested upon the ground or other surface upon which the foundations or skids are rested. That is to say, the construction and arrangement are such as to permit swinging or moving as a unit of each spacing and supporting frame 30 and the elongated weight supporting element 20 carried thereby between elevated and horizontal positions, so that the elongated weight supporting elements can be parallel with the foundations or skids to be rested upon the ground or other surface when this may be desirable, as well as to permit adjustment of said elongated weight supporting elements to any desired angular relation with respect to said foundations or skids. Stated differently, the parts of the apparatus or gallows frame are constructed and related to each other to make possible the resting of each elongated weight supporting element, while assembled with its corresponding foundation or skid, upon the ground or other supporting surface for the foundations or skids of said apparatus or gallows frame. Clearly, the elongated weight supporting elements 20 are swingable or movable upon the cross members or cross shafts 28 as axes in direction longitudinally of the I-beams 27 and are swingable or movable upon the cross members or cross shafts 34 as axes in direction transversely of said I-beams. Also, the elongated weight supporting elements 20 obviously may be swung upon the cross members or cross shafts 34 as axes in direction toward and away from each other, so as to be parallel, or out of parallel, as in a particular instance may be desirable and intentional.

The head frame or cross-beam 22 may be of any construction suitable to its purposes, one of which is to support pulleys, or equivalent, 39 to be employed to the accomplishment of hoisting operations. As shown, the outer or upper ends of the elongated weight supporting elements 20, 20 are pivotally assembled at 40 with the opposite end portions of the head frame or cross-beam 22 in such manner as to permit relative swinging movement of each of said elongated weight supporting elements and said head frame or cross-beam in direction transversely of the foundations or skids 21 and the I-beams 27, 27, 27, 27 thereof and longitudinally of the head frame or cross-beam 22. That is, the elongated weight supporting elements 20, 20 are pivotally assembled with said head frame or cross-beam 22 to permit relative swinging movement of said elongated weight supporting elements in direction toward and away from each other in a plane passed longitudinally through the weight supporting elements.

The outer or upper end of each weight supporting element 20 suitably and conveniently rigidly supports a gudgeon pin 41 which extends longitudinally of the weight supporting element and outwardly or upwardly to position beyond or above the head frame or cross-beam 22. A guy cap 42 is mounted for free rotational movement upon each gudgeon pin 41, and an inner or lower flat surface 43 of each guy cap is supported for movement of rotation upon an outer or upper flat surface 44 of a core entity 45 upon the corresponding gudgeon pin 41. The lower end of each core entity 45 rests upon the corresponding elongated weight supporting element 20. Each of guy lines 46 includes an upper end portion 47 thereof suitably and conveniently secured to a guy cap 42 and a lower end portion 48 thereof adapted to be suitably and conveniently secured to the ground, or other anchor. There are a plurality of guy lines 46 for each guy cap 42, and the guy lines are disposed in spaced apart relation to each other about the guy caps, an arrangement substantially as disclosed in the drawings being satisfactory. Turnbuckles 49, one for each guy line, are for the purpose of accomplishing ready and suitable tightening and loosening of the guy lines. The construction and arrangement will be such that when the guy lines 46 are anchored, as in Fig. 1 of the drawings, the elongated weight supporting elements 20, 20 will be rigidly retained at the position of adjustment to which they have been set. It will be apparent that mounting of the guy caps 42 freely upon longitudinal axes of the elongated weight supporting elements is adapted to insure that there will be equalization of the different guy loads.

Each of the core entities 45 consists as disclosed of an inner tubular member 50 upon the corresponding gudgeon pin 41 and an outer tubular member 51 in surrounding relation to the inner tubular member 50, and each of the opposite end portions of the head frame or cross-beam 22 is mounted for universal movement relative to its corresponding elongated supporting element 20 through the instrumentality of the corresponding core entity 45. More explicitly, the head frame or cross-beam 22 consists of spaced I-beams which support spaced apart sets of alined, inwardly extending pintles 52, 52 situated in the outer tubular members 51, 51 of the core entities 45, 45, respectively, thus to constitute the pivotal supports 40 hereinbefore referred to, and the outer tubular member 51 of each core entity 45 supports alined, inwardly extending pintles 53, 53 situated in the inner tubular member 50 of the corresponding core entity. The alined pintles 52, 52 are perpendicular to and in the same plane as the alined pintles 53, 53. Clearly, the gudgeon pins 41 are swingable or movable upon the pintles 52, 52 as axes in direction longitudinally of the head frame or cross-beam 22 and are swingable or movable upon the pintles 53, 53 as axes in direction transversely of said head frame or cross-beam. Also, the elongated weight supporting elements 20, 20 obviously may be swung upon the pintles 52, 52 as axes in direction toward and away from each other, so as to be parallel or out of parallel as in a particular instance may be desirable or intentional, and may be swung upon the pintles 53, 53 as axes in direction transversely of the head frame or cross-beam 22.

Figure 12:
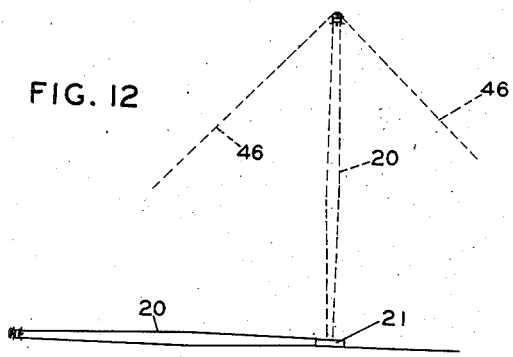
Figs. 12 to 17 are diagrammatic views illustrative of manipulations and uses of the apparatus during positioning and erecting functions in practical operation.
Figure 13:
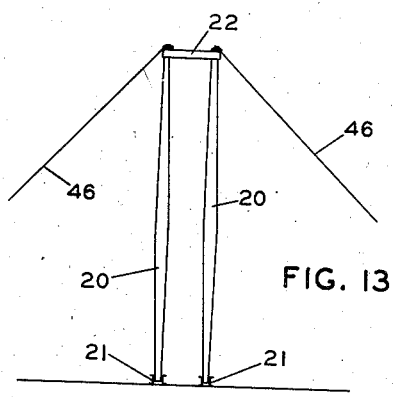

An apparatus or gallows frame consisting of elements and of general structure as hereinbefore set forth may be, and desirably is, assembled in ready and easy manner while the various parts of said apparatus or gallows frame are in horizontal position resting upon the ground or other surface for supporting the foundations or skids of the apparatus or gallows frame. After assembly of the several elements of said apparatus or gallows frame and placement of its foundations or skids at desired position, usually at opposite sides of a spot or definite situation to receive a heavy structure such as a still or pressure vessel, the elongated weight supporting elements 20, 20 of the apparatus or gallows frame may be swung or moved, upon one or both of the cross members or cross shafts 28 and 34 as axes, from the full line, horizontal position in Fig. 12 of the drawings to, or about to, the dotted line, elevated position in said Fig. 12 and there anchored, by employment of guy lines such as 46, either with the elongated weight supporting elements 20, 20 vertical and parallel, as in Figs. 1 and 13, or out of parallel and/or oblique, as in Fig. 19. In Fig. 1 the weight supporting elements 20, 20 and the foundations or skids 21, 21 are at opposite sides of the still or pressure vessel there shown. Stated otherwise, the weight supporting elements 20, 20 may be guyed down after being swung or moved from their full line position as in Fig. 12 to, or to the neighborhood of, their full line working position as in said Figs. 1 and 13, or as in said Fig. 19, or to any other intended working position for said weight supporting elements. Evidently, by reason of the universal connections between the elongated weight supporting elements and the foundations or skids, said elongated weight supporting elements can be elevated in any direction.

Figure 14:
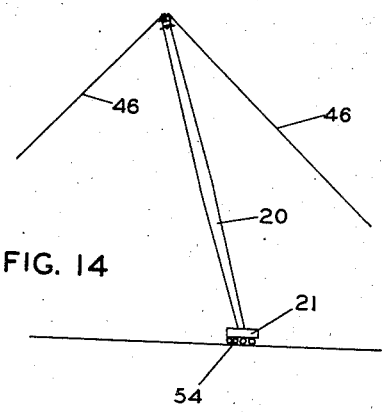
Figure 15:
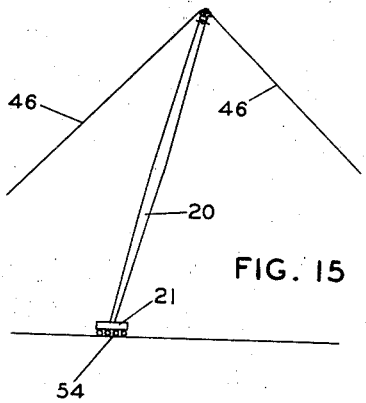
Figure 11:
Fig. 11 is an elevational view of a turnbuckle which can be employed in the apparatus.
Figure 16:
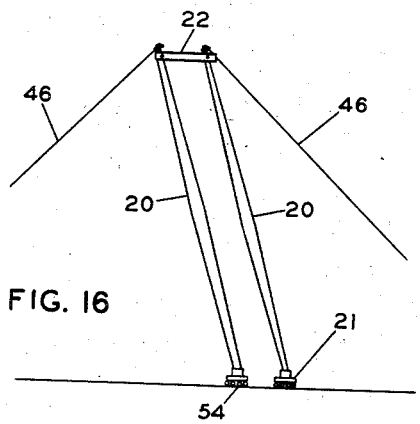
Figure 17:
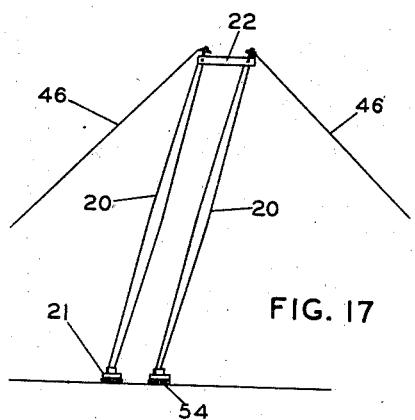

The apparatus or gallows frame is adapted to be moved, without disassembly, from a set position thereof, as upon the completion of the erection of a structure, still or pressure vessel, to a new position for the apparatus, as to a spot or situation where a structure, still or pressure vessel is to be erected after completion of the erection of a structure, still or pressure vessel. To the accomplishment of movement of the apparatus or gallows frame without disassembly thereof, the foundations or skids 21, 21 will be jacked up and rollers 54 will be inserted under said foundations or skids. In Figs. 14 and 15 the rollers 54 are arranged for movement of the apparatus or gallows frame in direction forwardly or rearwardly of a structure, still or pressure vessel longitudinally of the I-beams 27. That is, in said Figs. 14 and 15 the rollers 54 are disposed for movement of the apparatus or gallows frame clear of an erected structure as in Fig. 1. To accomplish movement of said apparatus or gallows frame clear of an erected structure, still or pressure vessel, the foundations or skids may be pulled upon the rollers 54 in direction away from the erected structure, still or pressure vessel, as disclosed or suggested in Fig. 14, while the guy lines 46 are appropriately simultaneously adjusted, thus to cause said foundations or skids to be removed from the positions which were their working positions at opposite sides of said erected structure, still or pressure vessel. Then, the elongated weight supporting elements 20, 20, the head frame or cross-beam 22, etc., may be swung or moved as a unit in the direction toward which the foundations or skids were pulled, as disclosed or suggested in Fig. 15, while further appropriately simultaneously adjusting said guy lines, thus to cause the apparatus or gallows frame as a whole to be clear of a structure, still or pressure vessel after completion of the erection. During movement of the parts of the apparatus or gallows frame in the direction as indicated or suggested in Figs. 14 and 15, in the manner as set forth, there obviously will be relative pivotal movement of the I-beams 27, 27 of the foundations or skids 21 and the weight supporting elements 20 and the spacing and supporting frame 30 as a unit upon or about the cross members or cross shafts 28 as axes. By adjustment of the rollers 54 to a position 90 degrees from their positions as in Figs. 14 and 15, movement of the apparatus or gallows frame normal to that suggested as performed in said Figs. 14 and 15 evidently can be accomplished in the general manner as set forth. More explicitly, Fig. 16 discloses or suggests pulling the foundations or skids 21, 21 upon the rollers 54 in direction normal to the direction in which said foundations or skids were moved to be clear of an erected structure, still or pressure vessel while simultaneously adjusting the guy lines, and Fig. 17 discloses or suggests swinging or moving the weight supporting elements 20, 20 and the head frame or cross-beam 22 in the direction toward which the foundations or skids were pulled in said Fig. 16 while further simultaneously adjusting said guy lines. During movement of the apparatus or gallows frame in the direction as indicated or suggested in Figs. 16 and 17, in the manner as set forth, there obviously will be relative pivotal movement of the weight supporting elements 20, 20 and the head frame or cross-beam 22 about or upon the pivotal supports 40, as well as relative pivotal movement of the I-beams 27, 27 of the foundations or skids 21 and the spacing and supporting frames 30 as a unit and said weight supporting elements about or upon the cross members or cross shafts 34 as axes. More explicitly, the capacity for relative pivotal movement of the parts of the apparatus or gallows frame as disclosed or suggested in Figs. 14, 15, 16 and 17, and as before described, will, plainly, permit the accomplishment of movement from place to place of said apparatus or gallows frame in the manner as set forth clear of an erected structure, still or pressure vessel, as from a location or working position to a different location or intended working position for said apparatus or gallows frame. Evidently, there is provision for movement of the apparatus or gallows frame in any direction along the ground or other supporting surface, and, also, there is provision for movement of said apparatus or gallows frame clear of obstructions which could possibly be in a direct path of movement of the apparatus or gallows frame. By repetition of operations as set forth in connection with Figs. 14, 15, 16 and 17, and/or by the accomplishment of variations of operations of the same general type, an apparatus or gallows frame made according to the invention can be readily and easily moved from one location to another while its parts are all assembled, around obstructions or not, as the situation in a particular instance may require.

Figure 18:
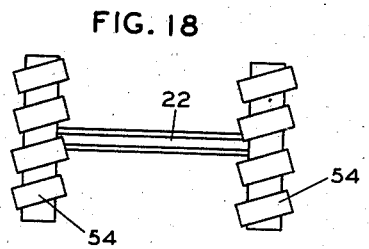
Fig. 18 is a bottom plan view of the apparatus somewhat diagrammatically disclosing rollers as when positioned to the purpose that movement of said apparatus in oblique direction can be accomplished.

In Fig. 18, which is a bottom plan view of the apparatus, somewhat diagrammatic, the rollers 54 are set at oblique relation to the set position of said rollers in Figs. 14, 15, 16 and 17. The purpose of the disclosure in said Fig. 18 is to make plain that movement of the apparatus or gallows frame in any direction can be accomplished in the general manner as hereinbefore set forth by appropriate placement of rollers such as 54. With movement of the foundations or skids upon rollers placed as in said Fig. 18, or placed at any angle or relation to the foundations or skids 21, 21 other than as in Figs. 14, 15, 16 and 17, there can be pivotal movement at both the cross members or cross shafts 28 and 34 and at all of the pintles 52, 52, 53, 53 upon pulling of the foundations or skids along the ground or other surface, as well as upon swinging movement of the elongated weight supporting elements. Stated differently, the provision of the lower and upper universal connections permits movement of the apparatus or gallows frame over the ground or other supporting surface therefor along any path which may be selected to be accomplished.

Figure 19:
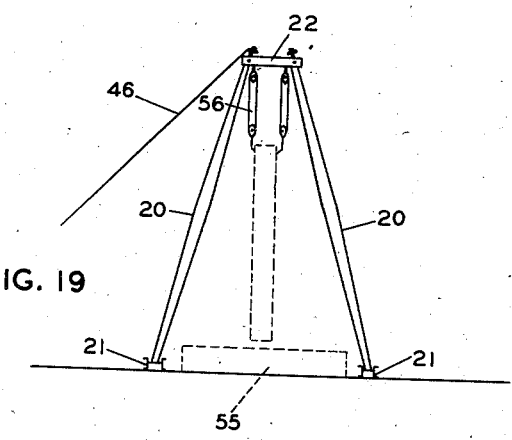
Fig. 19 is a diagrammatic view further illustrative of manipulations and uses of the apparatus.

In Fig. 19 the apparatus or gallows frame is disclosed as when situated to clear an obstruction such as a foundation 55. In said Fig. 19 the weight supporting elements are out of parallel and diverge downwardly, and the foundations or skids are situated beyond and outwardly of the opposite ends of the head frame or cross-beam. The construction and arrangement obviously make provision for variable base width of the apparatus or gallows frame. That is, the foundations or skids 21, 21 may be at greater or less distance apart during working operation of the apparatus or gallows frame.

Numeral 56 denotes cables, etc., associated with the pulleys 39 and adapted to be employed to the accomplishment of hoisting operations intended to be performed by utilization of the apparatus or gallows frame of the invention. The hoisting or up ending of structures, stills or pressure vessels may be accomplished in the apparatus in any well known or preferred manner.

Evidently, the universal connections between the elongated weight supporting elements and the foundations or skids and between said elongated weight supporting elements and the head frame or cross-beam 22 constitute provision for adjustment under load adapted to eliminate the possibility of eccentric loading. There can be no uneven bearing upon the foundations or skids. And said universal connections also obviously constitute provision for ready and easy removal of the apparatus from place to place, as well as for operation of said apparatus clear of obstructions such as that disclosed at 55 in Fig. 19, for example. Stated otherwise, the features and characteristics of the erecting apparatus here presented which at one and the same time adapt said apparatus to be operable without the possibility of eccentric loading and render it capable of being moved from place to place in stages by ready and comparatively easy manipulations performed in the manner as explained and of being operable clear of obstructions are interrelated to together render said erecting apparatus completely suitable to and efficient for the performance of each and all of its intended functions.

The novel and improved method and its several steps will be plain from the description hereinbefore made.

What is claimed is:

1. An erecting apparatus comprising a pair of separate foundations, an elongated weight supporting element upon each of said foundations, a cross-beam between and universally connected to each of said elongated weight supporting elements at location spaced from its corresponding foundation, means universally connecting each of said foundations and the elongated weight supporting element thereon to each other, and means for anchoring said foundations and said elongated weight supporting elements in fixed relation to each other.

2. An erecting apparatus comprising a pair of foundations, an elongated weight supporting element upon each of said foundations, a cross-beam between and connected to each of said elongated weight supporting elements at location spaced from its corresponding foundation for relative swinging movement of the elongated weight supporting elements toward and away from each other and for swinging movement of said elongated weight supporting elements relative to the cross-beam in direction transversely of said cross-beam, means connecting each of said foundations and the elongated weight supporting element thereon to each other for relative biaxial swinging movement of each foundation and its corresponding elongated weight supporting element, and means for anchoring said foundations and said elongated weight supporting elements in fixed relation to each other.

3. An erecting apparatus comprising a pair of foundations, an elongated weight supporting element upon each of said foundations, a cross-beam between and connected to each of said elongated weight supporting elements at location spaced from its corresponding foundation for relative swinging movement of the elongated weight supporting elements toward and away from each other and for swinging movement of said elongated weight supporting elements relative to the cross-beam in direction transversely of said cross-beam, means connecting each of said foundations and the elongated weight supporting element thereon to each other for relative swinging movement of each foundation and its corresponding elongated weight supporting element in directions longitudinally and transversely of said foundations, and means for anchoring said foundations and said elongated weight supporting elements in fixed relation to each other.

4. An erecting apparatus comprising a pair of separate foundations, an elongated weight supporting element upon each of said foundations, a cross-beam between said elongated weight supporting elements retaining the elongated weight supporting elements at substantial distance apart, means connecting said cross-beam to each of said elongated weight supporting elements at location spaced from its corresponding foundation for relative swinging movement of the elongated weight supporting elements toward and away from each other and for swinging movement of said elongated weight supporting elements relative to the cross-beam in direction transversely of said cross-beam, means connecting each of said foundations and the elongated weight supporting element thereon to each other for relative swinging movement of each foundation and its corresponding elongated weight supporting element in directions longitudinally and transversely of said foundations, and means for anchoring said foundations and said elongated weight supporting elements in fixed relation to each other.

5. An erecting apparatus comprising a pair of separate foundations, an elongated weight supporting element upon each of said foundations, a cross-beam between said elongated weight supporting elements retaining the elongated weight supporting elements at substantial distance apart, means connecting said cross-beam to each of said elongated weight supporting elements at location spaced from its corresponding foundation for relative swinging movement through a substantial arc of the elongated weight supporting elements toward and away from each other and for swinging movement through a substantial arc of said elongated weight supporting elements relative to the cross-beam in direction transversely of said cross-beam, means connecting each of said foundations and the elongated weight supporting element thereon to each other for relative swinging movement through substantial arcs of each foundation and its corresponding elongated weight supporting element in directions longitudinally and transversely of said foundations, and means for anchoring said foundations and said elongated weight supporting elements in fixed relation to each other.

6. An erecting apparatus comprising a pair of separate foundations, an elongated weight supporting element upon each of said foundations, a cross-beam between said elongated weight supporting elements retaining the elongated weight supporting elements at substantial distance apart, means connecting said cross-beam to each of said elongated weight supporting elements at location spaced from its corresponding foundation for relative swinging movement of the elongated weight supporting elements toward and away from each other and for swinging movement of said elongated weight supporting elements relative to the cross-beam in direction transversely of said cross-beam, means connecting each of said foundations and the elongated weight supporting element thereon to each other for relative angular movement of each foundation and its corresponding elongated weight supporting element in directions longitudinally and transversely of said foundations, and means for anchoring said foundations and said elongated weight supporting elements in fixed relation to each other.

7. An erecting apparatus comprising a pair of separate foundations, an elongated weight supporting element upon each of said foundations, a cross-beam between said elongated weight supporting elements retaining the elongated weight supporting elements at substantial distance apart, means connecting said cross-beam to each of said elongated weight supporting elements at location spaced from its corresponding foundation for relative swinging movement of the elongated weight supporting elements toward and away from each other and for swinging movement of said elongated weight supporting elements relative to the cross-beam in direction transversely of said cross-beam, means connecting each of said foundations and the elongated weight supporting element thereon to each other for angular movement of each elongated weight supporting element relative to its foundation in directions longitudinally and transversely of said foundations through a substantial arc, and means for anchoring said foundations and said elongated weight supporting elements in fixed relation to each other.

8. An erecting apparatus comprising a pair of separate foundations, an elongated weight supporting element upon each of said foundations, a cross-beam between said elongated weight supporting elements retaining the elongated weight supporting elements at substantial distance apart, means connecting said cross-beam to each of said elongated weight supporting elements at location spaced from its corresponding foundation for relative swinging movement of the elongated weight supporting elements toward and away from each other and for swinging movement of said elongated weight supporting elements relative to the cross-beam in direction transversely of said cross-beam, means connecting each of said foundations and the elongated weight supporting element thereon to each other for bi-axial angular movement of each elongated weight supporting element relative to its foundation through substantial arcs, and means for anchoring said foundations and said elongated weight supporting elements in fixed relation to each other.

9. An erecting apparatus comprising a pair of separate foundations, an elongated weight supporting element upon each of said foundations, a cross-beam between said elongated weight supporting elements retaining them at substantial distance apart, means universally connecting said cross-beam to each of said elongated weight supporting elements at location spaced from its corresponding foundation, means connecting each of said foundations and the elongated weight supporting element thereon to each other for relative bi-axial swinging movement of each foundation and its corresponding elongated weight supporting element, and means for anchoring said foundations and said elongated weight supporting elements in fixed relation to each other.

10. An erecting apparatus comprising a pair of separate foundations, an elongated weight supporting element upon each of said foundations, a cross-beam between said elongated weight supporting elements retaining them at substantial distance apart, means universally connecting said cross-beam to each of said elongated weight supporting elements at location spaced from its corresponding foundation, means connecting each of said foundations and the elongated weight supporting element thereon to each other for relative bi-axial swinging movement of each foundation and its corresponding elongated weight supporting element, and means including guy caps rotatable relative to said elongated weight supporting elements for anchoring said foundations and said elongated weight supporting elements in fixed relation to each other.

ROBERT J. STODDARD.

REFERENCES CITED

The following references are of record in the file of this patent:

UNITED STATES PATENTS

| Number | Name | Date |
|---|---|---|
| 670,674 | Hutchings | Mar. 26, 1901 |
| 1,084,043 | Shoup | Jan. 13, 1914 |
| 2,261,013 | Berby | Oct. 28, 1941 |
| 2,191,181 | Rogers | Feb. 20, 1940 |

FOREIGN PATENTS

| Number | Country | Date |
|---|---|---|
| 401,450 | Germany | Sept. 8, 1924 |